United States Patent
Fan et al.

(10) Patent No.: US 10,168,446 B2
(45) Date of Patent: Jan. 1, 2019

(54) MOBILE RADIOGRAPHIC INSPECTION SYSTEM AND LIFTING DEVICE FOR MOBILE RADIOGRAPHIC INSPECTION SYSTEM

(71) Applicants: NUCTECH COMPANY LIMITED, Beijing (CN); NUCTECH JIANGSU COMPANY LIMITED, Jiangsu (CN)

(72) Inventors: Xuping Fan, Beijing (CN); Quanwei Song, Beijing (CN); Hui Meng, Beijing (CN); Shunchang Feng, Beijing (CN)

(73) Assignees: Nuctech Company Limited, Beijing (CN); Nuctech Jiangsu Company Limited, Jiangsu (CN)

( * ) Notice: Subject to any disclaimer, the term of this patent is extended or adjusted under 35 U.S.C. 154(b) by 302 days.

(21) Appl. No.: 15/275,135

(22) Filed: Sep. 23, 2016

(65) Prior Publication Data

US 2017/0168191 A1 Jun. 15, 2017

(30) Foreign Application Priority Data

Dec. 10, 2015 (CN) .......................... 2015 1 0909403

(51) Int. Cl.
*B66F 11/00* (2006.01)
*G01V 5/00* (2006.01)
(Continued)

(52) U.S. Cl.
CPC .............. *G01V 5/0066* (2013.01); *B66F 3/08* (2013.01); *B66F 7/14* (2013.01); *B66F 7/28* (2013.01)

(58) Field of Classification Search
CPC ...... G01V 5/00; G01V 5/0066; G01V 5/0016; G01V 5/0008; B66F 3/00; B66F 3/08; B66F 3/46; B66F 11/00; B66F 11/04
(Continued)

(56) References Cited

U.S. PATENT DOCUMENTS

2007/0110215 A1 5/2007 Hu et al.
2008/0165932 A1 7/2008 Meng et al.
2013/0028376 A1 1/2013 Mastronardi et al.

FOREIGN PATENT DOCUMENTS

CN 1627061 A 6/2005
CN 1627184 A 6/2005
(Continued)

OTHER PUBLICATIONS

Extended European Search Report dated Apr. 13, 2017, in EP Application No. 16188466.3; 5 pages.
(Continued)

*Primary Examiner* — Jurie Yun
(74) *Attorney, Agent, or Firm* — Knobbe, Martens, Olson & Bear, LLP

(57) ABSTRACT

The present disclosure relates to mobile radiographic inspection systems and lifting devices for mobile radiographic inspection systems, including those, for example, in the field of radiographic detection of large objects such as containers. In one illustrative implementation, the present disclosure describes a lifting device for a mobile radiographic inspection system, the device comprising a driving motor and at least two screw lifters, wherein the driving motor is connected to each of the screw lifters via a transmission, and a lower end of a lifting rod of the screw lifter is configured to connect with a radiographic inspection device. In implementations, the lifting device may further comprise a mounting assembly, which is adapted to connect the lifting device to a vehicle body of the mobile radiographic inspection system.

20 Claims, 3 Drawing Sheets

(51) Int. Cl.
  *B66F 7/14* (2006.01)
  *B66F 3/08* (2006.01)
  *B66F 7/28* (2006.01)
(58) Field of Classification Search
  USPC .................................................. 378/57, 198
  See application file for complete search history.

(56) References Cited

FOREIGN PATENT DOCUMENTS

| | | |
|---|---|---|
| CN | 2715148 Y | 8/2005 |
| CN | 101210893 A | 7/2008 |
| CN | 203346005 U | 12/2013 |
| CN | 104444944 A | 3/2015 |
| CN | 205241152 U | 5/2016 |
| JP | H8-266133 | 10/1996 |

OTHER PUBLICATIONS

First Office dated Apr. 5, 2017 and first Search Report in Chinese Patent Application No. 201510909403.2 (7 pgs), and concise English-language summary thereof (2 pgs); 9 pages total.

MOBILE RADIOGRAPHIC INSPECTION SYSTEM AND LIFTING DEVICE FOR MOBILE RADIOGRAPHIC INSPECTION SYSTEM

CROSS REFERENCE TO RELATED APPLICATION(S)

This application is based upon and claims benefit/priority of Chinese Patent Application No. 201510909403.2, filed on Dec. 10, 2015, published as CN105366584A, which are incorporated herein by reference in entirety.

BACKGROUND

Field

The present disclosure relates to a field of detection for large objects (such as containers), and more particularly to a lifting device for a mobile radiographic inspection system and a mobile radiographic inspection system having the lifting device.

Description of the Related Information

A mobile container inspection system can be applied in national security such as customs and counter-terrorism, and can provide operational mobility, high integration and easy operation. The mobile container inspection system comprises a radiographic inspection device (such as electron linear accelerator, X-ray machine, radionuclide detector, neutron emitter and the like) disposed on a scanning vehicle to detect large objects, such as containers. Normally, the mobile container inspection system comprises a lifting device for driving the radiographic inspection device to move in a vertical direction. The lifting device usually adopts hydraulic cylinders, chains and the like to adjust a height of the radiographic inspection device such that the radiographic inspection device can be at a low position for scanning or at a high position for transportation and can also be adapted to both sedans with low heights and container trucks with high height.

However, a radiographic inspection device of a mobile radiographic inspection system is disposed in a restricted transverse space, while a traditional lifting device is disposed at a lateral side of the radiographic inspection device and thus requires a large transverse space. The lifting device can be adjusted at only one side of the radiographic inspection device, which causes a bad stability of adjustment.

Therefore, there is needed a lifting device for a mobile radiographic inspection system that can be disposed in a small transverse space and has good adjustment stability.

OVERVIEW OF SOME ASPECTS

An advantage of the present disclosure is to provide a lifting device for a mobile radiographic inspection system that can be disposed in a small transverse space and has good adjustment stability.

Another advantage of the present disclosure is to provide a mobile radiographic inspection system that can achieve easy installation, compact structure and stable adjustment.

To achieve these and other advantages, according to an aspect of the disclosure, there is provided a lifting device for a mobile radiographic inspection system, comprising: a driving motor and at least two screw lifters, wherein the driving motor is connected to each of the screw lifters via a transmission, and a lower end of a lifting rod of the screw lifter is configured to connect with a radiographic inspection device; and wherein the lifting device further comprises a mounting assembly, which is adapted to connect the lifting device to a vehicle body of the mobile radiographic inspection system.

In some implementations, four screw lifters may be provided, with these screw lifters being disposed outside of the driving motor to form a rectangle shape, and the driving motor is connected to each of the screw lifters through reversing units and drive shafts.

Furthermore, the mounting assembly comprises two mounting supports; one of the mounting supports is disposed between two adjacent screw lifters, and the other of the mounting supports is disposed at a corresponding position between other two adjacent screw lifters.

According to some aspects, the mounting support may comprise a mounting seat and two supporting rods that are obliquely disposed, an upper end of the supporting rod is connected to the mounting seat, and a lower end of the supporting rod is connected to an outside housing of the lifting rod.

In various systems, the mounting seat may be provided with bolt holes, and the mounting seat is adapted to be connected to the vehicle body of the mobile radiographic inspection system via bolts.

Further, each screw lifter may be connected at its lower end to a lifting strut via a connecting member, and each lifting strut is adapted to connect with the radiographic inspection device.

Furthermore, a supporting bar may be provided between respective lower ends of at least two adjacent lifting struts.

According to another aspect of the disclosure, there is provided a mobile radiographic inspection system, comprising: a vehicle body, a radiographic inspection device and a lifting device according to any of the above paragraphs, wherein the radiographic inspection device is connected to the vehicle body via the lifting device; the radiographic inspection device is adapted to perform a scanning and imaging to an object to be detected; and the lifting device is adapted to move the radiographic inspection device in a vertical direction.

In some implementations, a mobile radiographic inspection system may further comprises: a rotary platform that is pivotally disposed at an upper side of the vehicle body; and the lifting device is connected, at a lower side of the rotary platform, to both lateral sides of the rotary platform via two mounting supports that are provided at two sides of the lifting device.

In the disclosure, "the mounting assembly is adapted to connect the lifting device to a vehicle body of the mobile radiographic inspection system" includes that the mounting assembly directly connects with the vehicle body or the mounting assembly indirectly connects with the vehicle body via other members.

The present disclosure provides the following advantages, among others. According to the disclosure, at least two screw lifters drive the radiographic inspection device to move in a height direction, thus it is avoided to arrange the lifting device in a restricted transverse space and a stability of adjustment is improved. The mobile radiographic inspection system according to the disclosure advantageously adopts/receives the above lifting device, and thus can achieve easy installation, compact structure, stable adjustment and better applicability.

DETAILED DESCRIPTION OF ILLUSTRATIVE IMPLEMENTATIONS

Figure 1:
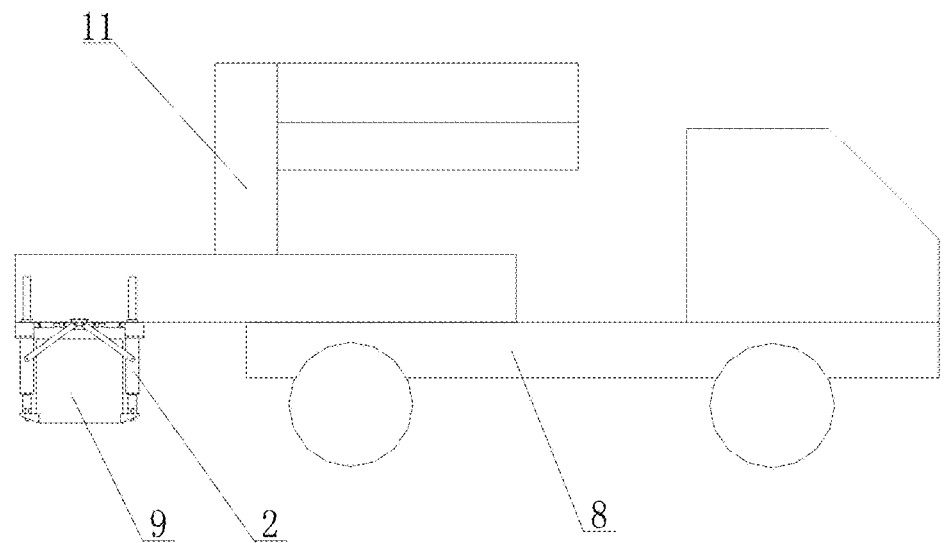
FIG. 1 is a structural schematic diagram of a mobile radiographic inspection system in a transportation mode according to an embodiment of the present disclosure.

The embodiments of the present disclosure will be described below with reference to the accompanying drawings. Elements shown in the drawings include a driving motor 1, a screw lifter 2, a reversing unit 3, a drive shaft 4, a mounting support 5, a mounting seat 51, a supporting rod 52, a lifting strut 6, a supporting bar 7, a vehicle body 8, a radiographic inspection device 9, a rotary platform 10, a portal frame 11, a vertical supporting arm 111, a horizontal cantilever arm 112, and a vertical suspending arm 113.

First Example

As shown in FIGS. 3-7, there is provided a lifting device for a mobile radiographic inspection system, which comprises a driving motor 1 and at least two screw lifters 2. The driving motor 1 is connected to each of the screw lifters 2 via a transmission. A lower end of a lifting rod of the screw lifter 2 is configured to connect with a radiographic inspection device 9. The lifting device further comprises a mounting assembly, which is adapted to connect the lifting device to a vehicle body of the mobile radiographic inspection system. The screw lifter according to the present embodiment comprises components such as a worm and a worm gear, a lead screw and the like. The driving motor drives the worm via a transmission such that the worm drives the worm gear to rotate. The worm gear is provided with internal screw thread in its inner chamber. The worm gear can drive the lead screw (i.e., the lifting rod) inserted therein to move up and down in a height direction.

According to the embodiment, it is avoided to arrange the lifting device in a restricted transverse space, thus the lifting device can be easily installed. Moreover, at least two screw lifters are connected to the radiographic inspection device 9, which improves a stability of adjustment.

Figure 3:
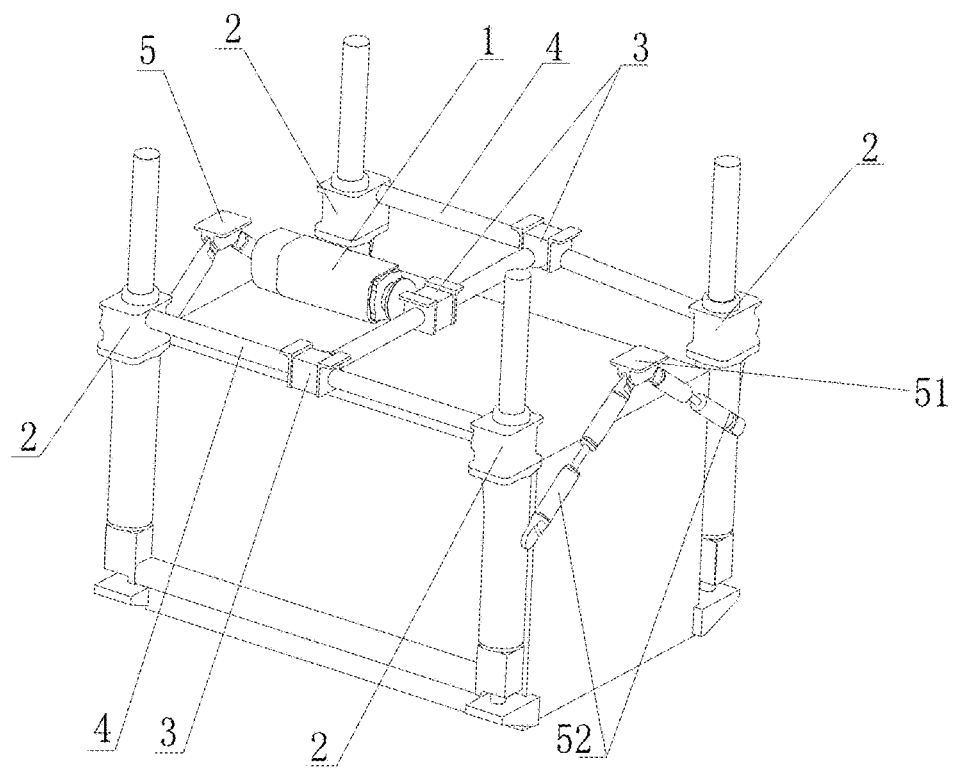
FIG. 3 is a perspective diagram of a lifting device for a mobile radiographic inspection system according to an embodiment of the present disclosure.
Figure 4:
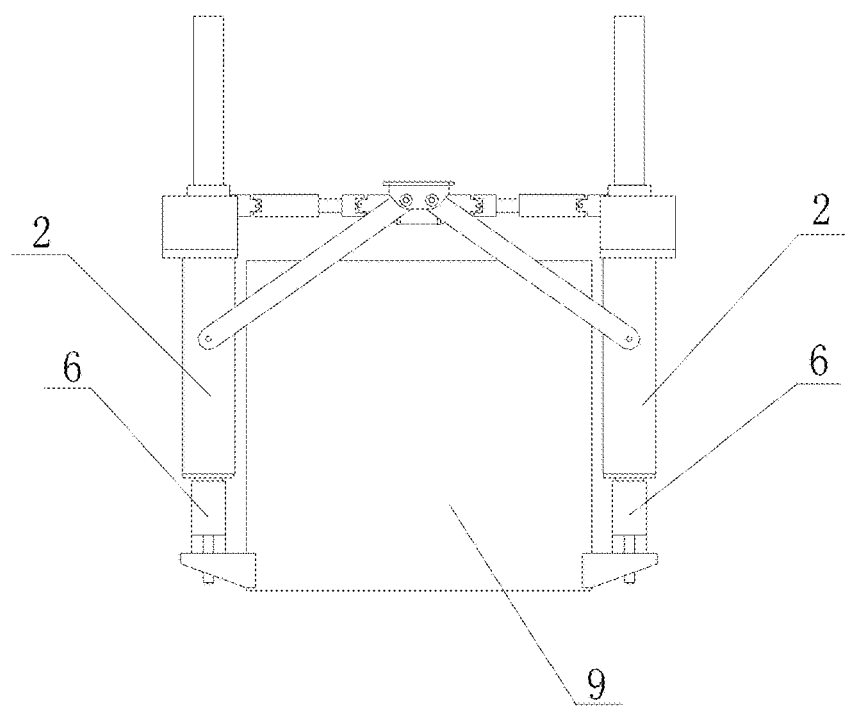
FIG. 4 is a structural schematic diagram of a lifting device for a mobile radiographic inspection system according to an embodiment of the present disclosure, in which the lifting device drives a radiographic inspection device to move to a high position.
Figure 5:
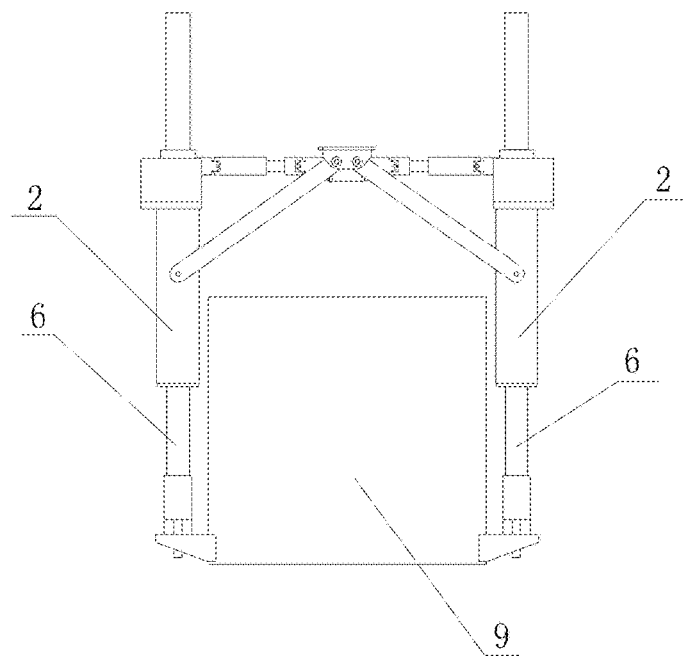
FIG. 5 is a structural schematic diagram of a lifting device for a mobile radiographic inspection system according to an embodiment of the present disclosure, in which the lifting device drives a radiographic inspection device to move to a low position.

In some implementations, there are provided four screw lifters 2. These screw lifters 2 are disposed outside of the driving motor 1 to form a rectangle shape. The driving motor 1 is connected to each of the screw lifters 2 through reversing units 3 and drive shafts 4. As shown in FIG. 3, the driving motor 1 sequentially connects with a reversing unit 3, a drive shaft 4 that is perpendicular to an output shaft of the driving motor 1, a reversing unit 3 and a drive shaft 4 that is parallel to the output shaft of the driving motor 1, in order to connect with the screw lifter 2. According to the disclosure, the number of the screw lifters 2 is preferably four, and thus the lifting device has a simple structure and an adjustment stability of the lifting device is ensured. However, it should be noted that the number of the screw lifters 2 is not limited to four, but can be varied as required.

Furthermore, as shown in FIG. 3, the mounting assembly may comprise two mounting supports 5. Particularly, one mounting support 5 is disposed between two adjacent screw lifters 2, and the other mounting support 5 is disposed at a corresponding position between other two adjacent screw lifters 2. According to the embodiment, the mounting assembly comprises two mounting supports 5 such that the lifting device can be connected to the vehicle body at two spots, and thereby a mounting stability of the lifting device is ensured.

According to specific embodiments, the mounting support 5 may comprise a mounting seat 51 and two supporting rods 52 that are obliquely disposed. An upper end of the supporting rod 52 is connected to the mounting seat 51, and a lower end of the supporting rod 52 is connected to an outside housing of the lifting rod. The mounting seat is provided with bolt holes. The mounting seat 51 can be connected to the vehicle body of the mobile radiographic inspection system via bolts. The number of the bolt holes can be varied as required and thus is not limited to a specific number. According to the embodiment, the mounting seat supported between the two screw lifters can maintain a structural stability of the lifting device to some degree.

Figure 6:
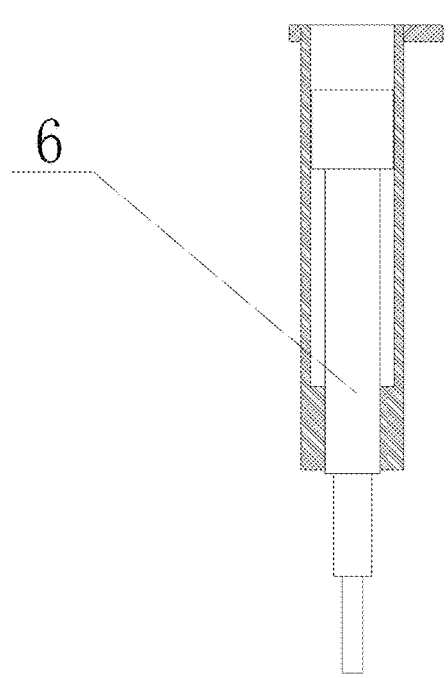
FIG. 6 is a structural schematic diagram of a lifting strut in a high position according to an embodiment of the present disclosure.
Figure 7:
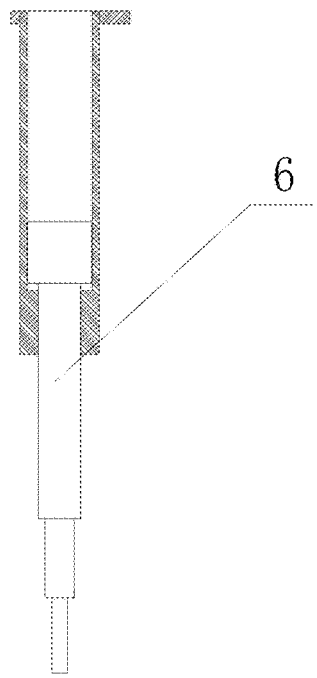
FIG. 7 is a structural schematic diagram of a lifting strut in a low position according to an embodiment of the present disclosure.

Furthermore, as shown in FIGS. 6 and 7, each screw lifter 2 may be connected at its lower end to a lifting strut 6 via a connecting member. Each lifting strut 6 is adapted to connect with the radiographic inspection device 9.

In some systems, a supporting bar 7 is provided between respective lower ends of at least two adjacent lifting struts 6 to improve the structural stability of the lifting device. According to the embodiment, it is preferable to provide the supporting bar between respective lower ends of two adjacent lifting struts 6 that are not connected with each other via the mounting support 5. According to the embodiment, the supporting bar 7 is preferably a horizontal bar.

Second Example

Figure 2:
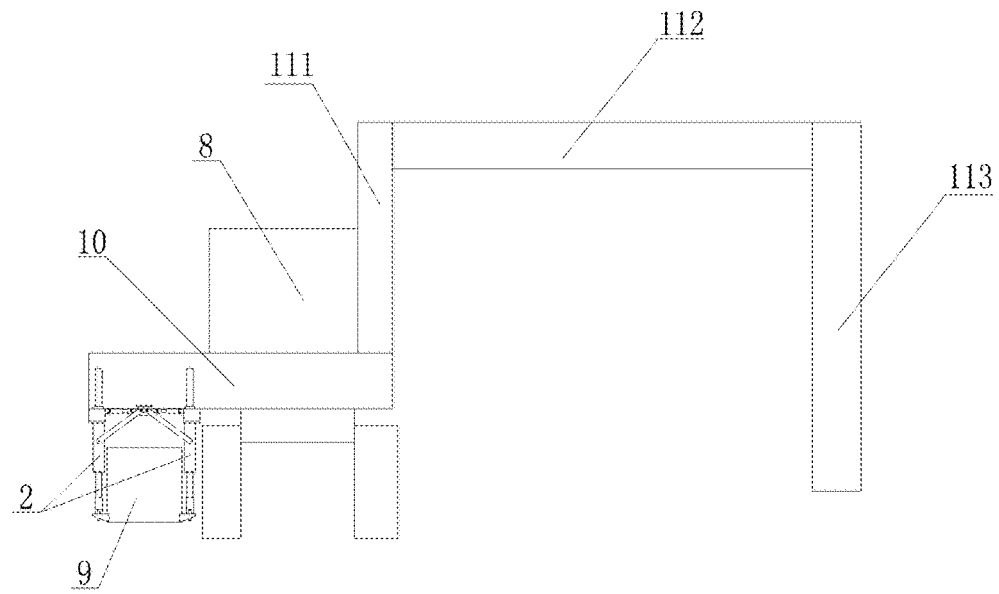
FIG. 2 is a structural schematic diagram of a mobile radiographic inspection system in a scanning mode according to an embodiment of the present disclosure.

According to the present embodiment, as shown in FIGS. 1 and 2, there is provided a mobile radiographic inspection system, which comprises a vehicle body 8, a radiographic inspection device 9 and a lifting device according to the first example. The radiographic inspection device 9 is connected to the vehicle body via the lifting device. The radiographic inspection device 9 is adapted to perform a scanning and imaging to an object to be detected. The lifting device is adapted to move the radiographic inspection device 9 in a vertical direction, such that the radiographic inspection device can be moved downward to a low position at which the radiographic inspection device can detect the object to be detected or moved upward to a high position at which the radiographic inspection device can be transported.

In some implementations, the mobile radiographic inspection system may further comprise a rotary platform 10 that is pivotally disposed at an upper side of the vehicle body. The lifting device is connected, at a lower side of the rotary platform 10, to both lateral sides of the rotary platform 10 via two mounting supports 5 that are provided at two sides of the lifting device. The lifting device can rotate along with the rotary platform 10 to move the radiographic inspection device to a desired position.

Furthermore, according to some embodiments, the mobile radiographic inspection system may further comprise a collapsible portal frame 11 that is a side of the rotary platform opposite to the lifting device in order to designate a zone at which the object to be detect can pass through and be inspected. Specifically, the portal frame 11 comprises a vertical supporting arm 111, a horizontal cantilever arm 112 and a vertical suspending arm 113 that are connected in this sequence. A lower end of the vertical supporting arm 111 is connected to the rotary platform. A driving device (such as hydraulic cylinder) is provided between the horizontal cantilever arm 112 and the vertical suspending arm 113 to rotate the vertical suspending arm with respect to the horizontal cantilever arm.

According to various embodiments, the vehicle body may be a vehicle including a power source or a driven vehicle without power source, such as a semitrailer. According to the embodiment, the vehicle body may be provided with an operation cabin in which an operator can control the mobile radiographic inspection system. Alternatively, the vehicle body does not comprise an operation cabin, and the mobile radiographic inspection system may be controlled through a remote device or a controlling vehicle electrically connected with the vehicle body.

According to certain embodiment, a method of use is provided, which comprises: parking the vehicle body at a spot for detection; before starting a detection, driving and rotating, by the rotary platform, the lifting device and the radiographic inspection device to a desired position (for example, rotating by 90 degree from the position shown in FIG. 1 to the position shown in FIG. 2); unfolding the portal frame, and driving, by the driving motor, the lifting rods of the screw lifters to move downward such that the radiographic inspection device is moved to the low position for scanning; after the detection, folding the portal frame, and driving, by the driving motor, the lifting rods of the screw lifters to move upward such that the radiographic inspection device is moved to the high position for transportation.

The mobile radiographic inspection system according to the embodiment adopts the above lifting device, and thus can achieve easy installation, compact structure, stable adjustment and better applicability.

The above embodiments describe technical aspects or principles of the present disclosure. The above embodiments are merely provided for describing illustrative principles of the present innovations, but not intended to limit the scope of the present inventions in any way. Other specific implementations may be made by one skilled in the art based on the explanation herein without creative work, and all such implementations also fall within the protection scope of the inventions herein.

What is claimed is:

1. A lifting device for a mobile radiographic inspection system, the device comprising:
    a driving motor; and
    at least two screw lifters;
    wherein the driving motor is connected to each of the screw lifters via a transmission, and a lower end of a lifting rod of the screw lifter is configured to connect with a radiographic inspection device; and
    wherein the lifting device further comprises a mounting assembly, which is adapted to connect the lifting device to a vehicle body of the mobile radiographic inspection system.

2. The lifting device for the mobile radiographic inspection system according to claim 1, wherein there are provided four screw lifters, the four screw lifters being disposed outside of the driving motor to form a rectangle shape, and the driving motor is connected to each of the screw lifters through reversing units and drive shafts.

3. The lifting device for the mobile radiographic inspection system according to claim 2, wherein the mounting assembly comprises two mounting supports; and
    wherein one of the mounting supports is disposed between two adjacent screw lifters, and the other of the mounting supports is disposed at a corresponding position between other two adjacent screw lifters.

4. The lifting device for the mobile radiographic inspection system according to claim 3, wherein the mounting support comprises a mounting seat and two supporting rods that are obliquely disposed, an upper end of the supporting rod is connected to the mounting seat, and a lower end of the supporting rod is connected to an outside housing of the lifting rod.

5. The lifting device for the mobile radiographic inspection system according to claim 4, wherein the mounting seat is provided with bolt holes, and the mounting seat is adapted to be connected to the vehicle body of the mobile radiographic inspection system via bolts.

6. The lifting device for the mobile radiographic inspection system according to claim 3, wherein each screw lifter is connected at its lower end to a lifting strut via a connecting member, and each lifting strut is adapted to connect with the radiographic inspection device.

7. The lifting device for the mobile radiographic inspection system according to claim 6, wherein a supporting bar is provided between respective lower ends of at least two adjacent lifting struts.

8. The lifting device for the mobile radiographic inspection system according to claim 7, wherein the supporting bar is provided between respective lower ends of two adjacent lifting struts that are not connected with each other via the mounting support.

9. A mobile radiographic inspection system, the system comprising:
    a vehicle body;
    a radiographic inspection device; and
    a lifting device;
    wherein the radiographic inspection device is connected to the vehicle body via the lifting device;
    wherein the radiographic inspection device is adapted to perform a scanning and imaging to an object to be detected;
    wherein the lifting device is adapted to move the radiographic inspection device in a vertical direction; and
    wherein the lifting device comprises:
        a driving motor and at least two screw lifters, wherein the driving motor is connected to each of the screw lifters via a transmission, and a lower end of a lifting rod of the screw lifter is configured to connect with the radiographic inspection device; and
        a mounting assembly, which is adapted to connect the lifting device to the vehicle body of the mobile radiographic inspection system.

10. The mobile radiographic inspection system according to claim 9, further comprising:
    a rotary platform that is pivotally disposed at an upper side of the vehicle body;
    wherein the lifting device is connected, at a lower side of the rotary platform, to both lateral sides of the rotary platform via two mounting supports that are provided at two sides of the lifting device.

11. The mobile radiographic inspection system according to claim 10, further comprising: a collapsible portal frame that is provided at a side of the rotary platform opposite to the lifting device.

12. The mobile radiographic inspection system according to claim 11, wherein the portal frame comprises a vertical supporting arm, a horizontal cantilever arm and a vertical suspending arm that are connected in this sequence.

13. The mobile radiographic inspection system according to claim 12, wherein a lower end of the vertical supporting arm is connected to the rotary platform, and wherein a driving device is provided between the horizontal cantilever arm and the vertical suspending arm to rotate the vertical suspending arm with respect to the horizontal cantilever arm.

14. The mobile radiographic inspection system according to claim 9, wherein there are provided four screw lifters, the four screw lifters being disposed outside of the driving motor to form a rectangle shape, and the driving motor is connected to each of the screw lifters through reversing units and drive shafts.

15. The mobile radiographic inspection system according to claim 14, wherein the mounting assembly comprises two mounting supports; and
wherein one of the mounting supports is disposed between two adjacent screw lifters, and the other of the mounting supports is disposed at a corresponding position between other two adjacent screw lifters.

16. The mobile radiographic inspection system according to claim 15, wherein the mounting support comprises a mounting seat and two supporting rods that are obliquely disposed, an upper end of the supporting rod is connected to the mounting seat, and a lower end of the supporting rod is connected to an outside housing of the lifting rod.

17. The mobile radiographic inspection system according to claim 16, wherein the mounting seat is provided with bolt holes, and the mounting seat is adapted to be connected to the vehicle body of the mobile radiographic inspection system via bolts.

18. The mobile radiographic inspection system according to claim 15, wherein each screw lifter is connected at its lower end to a lifting strut via a connecting member, and each lifting strut is adapted to connect with the radiographic inspection device.

19. The mobile radiographic inspection system according to claim 18, wherein a supporting bar is provided between respective lower ends of at least two adjacent lifting struts.

20. The mobile radiographic inspection system according to claim 19, wherein the supporting bar is provided between respective lower ends of two adjacent lifting struts that are not connected with each other via the mounting support.

* * * * *